United States Patent [19]
Okuda et al.

[11] Patent Number: 6,011,083
[45] Date of Patent: *Jan. 4, 2000

[54] EMULSION INK FOR STENCIL PRINTING

[75] Inventors: Sadanao Okuda; Masato Ishikawa; Takashi Suzuki; Takahiro Wakayama; Yoshihiro Hayashi, all of Inashiki-gun, Japan

[73] Assignee: Riso Kagaku Corporation, Tokyo, Japan

[ * ] Notice: This patent is subject to a terminal disclaimer.

[21] Appl. No.: 08/874,633

[22] Filed: Jun. 13, 1997

[30] Foreign Application Priority Data

Jun. 18, 1996 [JP] Japan .................................. 8-177518

[51] Int. Cl.7 ........................................................ C09D 5/00
[52] U.S. Cl. ................................................ 523/161
[58] Field of Search ................................................ 523/161

[56] References Cited

U.S. PATENT DOCUMENTS

| Re. 28,779 | 4/1976 | Katayama ............................... 252/316 |
| 3,687,887 | 8/1972 | Zabiak . |
| 5,512,622 | 4/1996 | Tise et al. . |
| 5,575,839 | 11/1996 | Okuda . |
| 5,609,670 | 3/1997 | Okuda et al. . |
| 5,620,693 | 4/1997 | Piot ......................................... 424/401 |
| 5,645,609 | 7/1997 | Andrean ..................................... 8/405 |
| 5,718,748 | 2/1998 | Suzuki .................................. 106/31.26 |

FOREIGN PATENT DOCUMENTS

| 2 100 449 | 3/1972 | European Pat. Off. . |
| 0 786 502 | 7/1997 | European Pat. Off. . |
| 61-255967 | 11/1986 | Japan . |
| 64-14284 | 1/1989 | Japan . |
| 4-132777 | 5/1992 | Japan . |
| 5-117565 | 5/1993 | Japan . |
| 7-188598 | 7/1995 | Japan . |
| 8-34944 | 2/1996 | Japan . |

*Primary Examiner*—Paul R. Michl
*Attorney, Agent, or Firm*—Pillsbury Madison & Sutro LLP

[57] ABSTRACT

A water-in-oil (W/O) emulsion ink for stencil printing is provided, which is excellent in emulsion stability and drying, high in printing density and low in blurring and seep through. The W/O emulsion ink has an oil phase and a water phase, in which an acid anhydride containing water-soluble polymer is contained together with a water-insoluble colorant in said water phase. The acid anhydride containing water-soluble polymer is preferably an acid anhydride containing olefin copolymer, more specifically, an isobutylene-maleic anhydride copolymer, or an acid anhydride containing vinyl copolymer, more specifically, a styrene-maleic anhydride copolymer. Preferably, the oil phase comprises at least a solvent and an emulsifier, and the water phase comprises a water-in-oil (O/W) emulsion of resin and/or a water-soluble resin.

6 Claims, No Drawings

EMULSION INK FOR STENCIL PRINTING

The present invention relates to an emulsion ink for stencil printing, and more specifically relates to an emulsion ink which is excellent in emulsion stability and drying, high in printing density and low in blurring and seep through.

Stencil printing is effected by perforating a stencil sheet to make a master, and passing inks through the perforated portions of the master to an article to be printed such as printing paper. Since the master is easy to make, stencil printing is utilized in a wide range of fields.

Conventional emulsion inks for stencil printing are usually water-in-oil (W/O) emulsion inks which contain pigments as colorants in the oil phase thereof, as disclosed in Japanese Patent Laid-open (Kokai) Nos. 255967/86, 14284/89, 132777/92 and 117565/93. When compared with the water phase, the oil phase is higher in permeability and is lower in surface tension; thus, once this type of W/O emulsion inks are printed on an article such as printing paper to be printed, the oil phase, which is the outer phase of emulsion, first permeates the printed article, and then the water phase, which is the inner phase of emulsion, permeates the printed article and/or evaporates therefrom. Since the conventional W/O emulsion inks contain pigments in the oil phase, the inks are low in permeation speed. In addition, permeation of pigments contained in the oil phase occurs concurrently with the permeation of the oil phase, and as a result, the inks often have a problem on seep through because pigments deeply permeate into the printed article. Similarly, this phenomenon of permeation occurs on a surface of paper, causing inks to spread on the surface of the paper and blurring the printing.

In order to overcome such disadvantages as mentioned above, a W/O emulsion ink has been suggested, which contains a water-in soluble colorant dispersed in the water phase thereof, as disclosed in Japanese Patent Laid-open (Kokai) No. 188598/95. In this case, the components of the water phase remain on the surface of the article to be printed and dry thereon, because permeation of water phase occurs less on an article containing an oil phase already permeated thereinto. Thus, clear and high density printing free from blurring can be implemented because the colorants present in the water phase also become less permeable into the article. However, in order to maintain the water-insoluble colorants dispersed in the water phase and keep the emulsion stable, average particle size of the water-insoluble colorant must be reduced. Furthermore, a dispersant is necessary to finely and stably disperse water-insoluble colorants in the water phase. However, when the dispersant is present in the water phase, the W/O emulsion tends to lack long-term stability.

To overcome the aforementioned problems, Japanese Patent Laid-open (Kokai) No. 34944/96 proposed to add a polymer compound containing a tertiary amine into the water phase. In this case, however, further improvement is still required in dispersibility of the pigment and stability of the emulsion.

It is an object of the present invention to overcome the above-mentioned problems of prior art, and provide an emulsion ink for stencil printing, which is improved in emulsion stability and drying, high in printing density, and low in blurring and seep through.

According to the present invention, the above object is attained by a water-in-oil (W/O) emulsion ink for stencil printing, having an oil phase and a water phase, in which an acid anhydride containing water-soluble polymer is contained together with water-insoluble colorants in the water phase.

That is, the present invention is characterized by a water-in-oil (W/O) emulsion ink, in which a water-soluble polymer containing an acid anhydride is used as a dispersant so that water-insoluble colorants may remain dispersed stably in water for a long period of time.

Commonly used dispersants contain functional groups which adsorb to the surface of water-insoluble colorants, and such functional groups as generally known include carboxyl groups and sulfonic groups. However, the presence of such dispersants is believed to be a cause of impairing stability of the emulsion, because the functional groups mentioned above destroy the emulsion by adsorbing not only to the surface of the pigments, but also to the interface between the phases of the emulsion.

In the present invention, a water-soluble polymer containing an acid anhydride is used as the dispersant. Thus, it is believed that not only the emulsion is stabilized, but also the water-insoluble colorants are finely and stably dispersed in the water phase, so that quality of image is improved.

The acid anhydride containing water-soluble polymer is a compound having in molecule at least one group shown in formula (1):

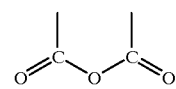

or salt or ester thereof, and can be selected from the group consisting of, for example, acid anhydride containing olefin copolymers, acid anhydride containing vinyl copolymers, and salts and esters thereof. The acid anhydride containing olefin copolymers include copolymers of olefins such as ethylene and isobutylene with ethylenically unsaturated monomers containing acid anhydrides such as maleic anhydride. The acid anhydride containing vinyl copolymers include copolymers of aromatic vinyl monomers, vinyl ester monomers or vinyl ether monomers with ethylenically unsaturated monomers containing acid anhydrides such as maleic anhydride. As aromatic vinyl monomers, mention may be made of styrene, α-methylstyrene, p-methylstyrene, vinyltoluene, p-butylstyrene, vinylnaphthalene, vinylanthracene, p-arylsulfoxyaminostyrene and p-styrenesulfonic acid and the like. As vinyl ester monomers, mention may be made of vinyl acetate, acrylic acid, acrylic acid ester, methacrylic acid ester and the like. As vinyl ether monomers, mention may be made of methylvinylether and the like. Copolymerization ratio of acid anhydride containing ethylenically unsaturated monomers to the above mentioned comonomers can be selected, taking into account water-solubility of desired copolymers, dispersibility of pigments or other effects on emulsion. Among them, preferred acid anhydride containing olefin copolymers are isobutylene-maleic anhydride copolymers shown in formula (2):

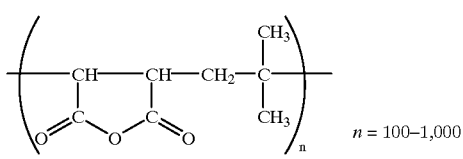

(2)

and preferred acid anhydride containing vinyl copolymers are styrene-maleic anhydride copolymers shown in formula (3):

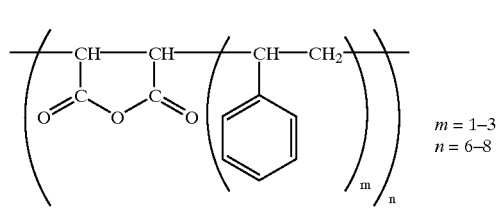

(3)

Some of the above mentioned acid anhydride containing water-soluble polymers require addition of alkali neutralizing agents when they are dissolved in water. However, these polymers are also included in the category of the above mentioned acid anhydride containing water-soluble polymers. Such neutralizing agents include ammonia water, sodium hydroxide, methylamine, ethylamine, sodium acetate, disodium hydrogenphosphate, urea, formaldehyde, and the like. Addition amount of such neutralizing agents varies depending upon degree of dissociation of acid anhydrides of the above polymers. It is desired that neutralizing agents are added to keep pH of the water phase within a range of 3 to 12, preferably 4 to 11.

Addition amount of the acid anhydride containing water-soluble polymer is not specifically limited. Generally speaking, the more the addition amount is, the greater the thickening effect is. Since dispersants, in such case, only have to be added in a minimum amount to finely and stably disperse the water-insoluble colorant in water, it is desired that the addition amount is appropriately determined depending upon kinds of polymers.

The water-insoluble colorant used in the water phase of the present emulsion ink is not specifically limited, but may be a known pigment and the like, preferably one excellent in affinity with water that is a principal medium for the colorant. Examples of the water-insoluble colorant for use in monochrome inks are carbon blacks such as furnace carbon black, lampblack, acetylene black and channel black, metals and metal oxides such as copper, iron, titanium oxide and calcium carbonate, and organic colorants such as azo pigments, cyanine pigments, dioxazines, quinacridone, and other various colorants commonly used in the art.

Average particle size of the water-insoluble colorant is preferably 10 $\mu$m or less, more preferably 3 $\mu$m or less, and most preferably 0.5 $\mu$m or less, taking into account emulsion stability. Addition amount of the water-insoluble colorant is preferably 1–30 % by weight, more preferably 3–10 % by weight based on the total of the emulsion ink.

In the present invention, the water phase may further comprise an oil-in-water (O/W) emulsion of resin and/or a water soluble resin, if necessary. By adding these components to the water phase, fixation of the water-insoluble colorant to articles to be printed such as paper can be improved.

Examples of the O/W emulsion of resin include emulsions of resins such as polyvinyl acetate, copolymers of ethylene and vinyl acetate, copolymers of vinyl acetate and acrylic acid esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and/or the water-soluble resin is preferably 20% by weight or less, more preferably 10% by weight or less as solid content based on the total weight of the ink. An amount of addition exceeding 20% by weight is not preferred. If it exceeds 20% by weight, inks form a film on perforations of a stencil sheet when they are left on the stencil sheet for a long time, and prevents inks from passing further through the perforations.

As required, the water phase may further contain other water soluble additives such as wetting agents, electrolytes, antifungal agents, antioxidants, water evaporation inhibiting agents and the like.

In the present invention, the oil phase comprises at least a non-volatile solvent, a volatile solvent, and an emulsifier. Furthermore, an oil-soluble polymer compound can be added into the oil phase as an auxiliary solubilizing agent for the emulsifier or a viscosity imparting agent. Alternatively, an extending pigment can be used as a viscosity imparting agent.

As the non-volatile solvent, there can be used mineral oils such as motor oils, spindle oils, machine oils and liquid paraffin, and vegetable oils such as olive oil, castor oil and salad oils. As the volatile solvent, there can be used known solvents of the types of mineral oils and vegetable oils. Proportion of non-volatile solvent to volatile solvent (i.e., non-volatile solvent/volatile solvent) varies depending upon blending ratio of the oil phase and the water phase, but can generally be 50–95/50–5 on weight basis.

The emulsifier is used to form the W/O emulsion, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides, fatty acid diglycerides, and ethylene oxide adducts of higher alcohols, alkylphenols, fatty acids or the like.

Oil-soluble polymer compounds include petroleum resin, alkyd resin, phenolic resin, these resins modified with fatty acids, and the like.

The extending pigment includes inorganic fine particles such as of terra alba, talc, clay, diatomaceous earth, calcium carbonate, barium sulfate, titanium oxide, alumina white, silica, kaolin, mica and aluminum hydroxide, and organic fine particles such as of polyacrylate, polyurethane, polyester, polyethylene, polypropylene, polyvinyl chloride, polyvinylidene chloride, polystyrene, polysiloxane, phenolic resin, epoxy resin, benzoguanamine resin and copolymers thereof.

The present W/O emulsion ink can readily be made, for example, by gradually adding 90 to 30% by weight of the above mentioned water phase to 10 to 70% by weight of the above mentioned oil phase to emulsify the mixture.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Example 1

A W/O emulsion ink was prepared in accordance with the formulation shown in Table 1 and the following procedure. First, ion-exchanged water, ethylene glycol, furnace carbon black and an isobutylene-maleic anhydride copolymer (Isobam 104 (trade name) manufactured by KURARAY CO., LTD.) were mixed together and dispersed using a bead mill to obtain a water phase.

Then, an oil phase was prepared by thoroughly mixing an alkyd resin, #40 motor oil, No.5 solvent manufactured by Nippon Oil Co. Ltd. and sorbitan monooleate under stirring. Then, emulsification using a stirrer was performed while gradually adding the water phase obtained above into the oil phase, so as to obtain an emulsion ink for stencil printing.

Example 2

A W/O emulsion ink was prepared in accordance with the formulation shown in Table 1 and the following procedure. First, after adding a styrene-maleic anhydride copolymer (SMA1000 (trade name) manufactured by ATOCHEM Co., Ltd.) into ion-exchanged water, the mixture was heated to 60° C. followed by addition of aqueous ammonia solution, and the resulting mixture was further heated to 70° C. to obtain an aqueous dispersant solution. Ethylene glycol and furnace carbon black were then dispersed in the solution using a bead mill, and an acrylic acid ester was further added thereto to obtain a water phase.

Then, an oil phase was prepared by thoroughly mixing an alkyd resin, #40 motor oil, No.5 solvent manufactured by Nippon Oil Co. Ltd. and sorbitan monooleate under stirring. Then, emulsification using a stirrer was performed while gradually adding the water phase obtained above into the oil phase, so as to obtain an emulsion ink for stencil printing.

Example 3

A W/O emulsion ink was prepared in accordance with the formulation shown in Table 1 and the following procedure. First, a water phase was prepared in the same manner as in Example 1. Then, an oil phase was prepared from #40 motor oil, No.5 solvent manufactured by Nippon Oil Co. Ltd., sorbitan monooleate and hydrophobic silica by dispersing them using a triple-roll mill. Then, emulsification using a stirrer was performed while gradually adding the water phase obtained above into the oil phase, so as to obtain an emulsion ink for stencil printing.

Comparative Example 1

A W/O emulsion ink was prepared in accordance with the formulation shown in Table 1 and the following procedure. First, an alkyd resin, furnace carbon black, #40 motor oil, No.5 solvent manufactured by Nippon Oil Co. Ltd. and sorbitan monooleate were sufficiently mixed together under stirring, and then the resulting mixture was thoroughly kneaded using a triple-roll mill to obtain an oil phase. Then, emulsification using a stirrer was performed while gradually adding a mixed solution of ion exchanged water and ethylene glycol into the oil phase obtained above, so as to obtain an emulsion ink for stencil printing.

Comparative Example 2

An emulsion ink for stencil printing was prepared in the same manner as in Example 1, except for using the formulation shown in Table 1.

TABLE 1

| Formulations of W/O emulsion inks (parts by weight) | | | | | |
|---|---|---|---|---|---|
| | Example 1 | Example 2 | Example 3 | Comparative Example 1 | Comparative Example 2 |
| Oil phase: | | | | | |
| Non-volatile solvent: #40 Motor oil | 8.0 | 8.0 | 15.0 | 6.0 | 8.0 |
| Volatile solvent: No. 5 solvent (manufactured by Nippon Oil Co. Ltd.) | 4.0 | 4.0 | 5.0 | 4.0 | 4.0 |
| Emulsifier: Sorbitan monooleate | 3.0 | 3.0 | 3.0 | 3.0 | 3.0 |
| Resin: Alkyd resin | 10.0 | 10.0 | — | 10.0 | 10.0 |
| Water-insoluble colorant: Furnace carbon black | — | — | — | 5.0 | — |
| Extending pigment: Hydrophobic silica | — | — | 1.0 | — | — |
| Water phase: | | | | | |
| Water-insoluble colorant: Furnace carbon black | 5.0 | 5.0 | 5.0 | — | 5.0 |
| Water: Ion-exchanged water | 64.0 | 58.6 | 61.0 | 67.0 | 64.0 |

TABLE 1-continued

Formulations of W/O emulsion inks (parts by weight)

|  | Example 1 | Example 2 | Example 3 | Comparative Example 1 | Comparative Example 2 |
| --- | --- | --- | --- | --- | --- |
| Dispersant: |  |  |  |  |  |
| Isobutylene-maleic anhydride copolymer | 1.0 | — | 1.0 | — | — |
| Styrene-maleic anhydride copolymer | — | 1.5 | — | — | — |
| Polyethylene imine | — | — | — | — | 1.0 |
| Neutralizer: 28% ammonia solution | — | 0.9 | — | — | — |
| O/W emulsion of resin: Acrylic acid ester | — | 5.0 | 5.0 | — | — |
| Wetting agent: Ethylene glycol | 5.0 | 4.0 | 4.0 | 5.0 | 5.0 |

Performance Tests

Stencil printing was effected by use of a stencil printing apparatus RISOGRAPH (registered trademark) SR7200 (manufactured by RISO KAGAKU CORPORATION) with each of the inks prepared in Examples 1 to 3 and Comparative Examples 1 and 2. Emulsion stability of these emulsion inks as well as printing density, seep through, blurring and set-off of prints thus obtained were determined in accordance with the following procedures (1)–(5), and the results are shown in Table 2.

(1) Emulsion stability: After the ink was left at 60° C. for six months, lowering rate of viscosity was measured in accordance with the following equation (1):

$$\text{lowering rate of viscosity} = (V1 - V2)/V1 \quad (1)$$

wherein V1 is viscosity before the ink is left, V2 is viscosity after the ink is left, and viscosity was measured by a Brookfield viscometer.

(2) Printing density: Printing density on a solid region of the print was measured using a reflection density measuring apparatus RD920 manufactured by Macbeth Corp.

(3) Seep through: Printing density on the side opposite to the solid region of the print was measured by the same reflection density measuring apparatus as in (2).

(4) Blurring: Blurring around the ink of the print was observed by use of a microscope of 80 magnification. When little blurring was observed, the result was indicated as (−) in Table 2. When blurring was conspicuous, the result was indicated as (+) in Table 2.

(5) Set-off: After 100 prints were continuously printed and stacked, the back sides of the prints were observed. When there was no set-off, the result was indicated as (−) in Table 2. When there was set-off, the result was indicated as (+) in Table 2.

TABLE 2

Evaluation Results for W/O emulsion inks

|  | Example 1 | Example 2 | Example 3 | Comparative Example 1 | Comparative Example 2 |
| --- | --- | --- | --- | --- | --- |
| Performance |  |  |  |  |  |
| Emulsion stability | 0.05 | 0.08 | 0.02 | 0.07 | 0.20 |
| Printing density | 1.21 | 1.23 | 1.26 | 0.97 | 1.23 |
| Seep through | 0.16 | 0.13 | 0.13 | 0.21 | 0.16 |
| Blurring | (−) | (−) | (−) | (+) | (−) |
| Set-off | (−) | (−) | (−) | (+) | (−) |

From Table 2, it is understood that Examples 1 to 3 provide prints superior in printing density, seep through, blurring and set-off to Comparative Example 1. Furthermore, Examples 1 to 3 are higher in emulsion stability as compared with Comparative Example 2.

Since the present W/O emulsion ink contains water-insoluble colorants in water phase, permeation of oil phase into articles to be printed is improved, so that the ink can readily be dried. Further, the present ink provides prints with little seep through or blurring. In addition, since the present emulsion ink contains an acid anhydride containing water-soluble polymer in the water phase, water-insoluble colorants are maintained to be finely and stably dispersed in the water phase, quality (coloring) of image on prints is ameliorated by virtue of the finely dispersed water-insoluble colorants, and emulsion is improved in long-term stability.

We claim:

1. A water-in-oil (W/O) emulsion ink for stencil printing, having an oil phase and a water phase, in which an acid anhydride containing water-soluble polymer is contained together with a water-insoluble colorant in said water phase.

2. An emulsion ink for stencil printing according to claim 1, in which said acid anhydride containing water-soluble polymer is an acid anhydride containing olefin copolymer or an acid anhydride containing vinyl copolymer.

3. An emulsion ink for stencil printing according to claim 2, in which said acid anhydride containing olefin copolymer is an isobutylene-maleic anhydride copolymer.

4. An emulsion ink for stencil printing according to claim 2, in which said acid anhydride containing vinyl copolymer is a styrene-maleic anhydride copolymer.

5. An emulsion ink for stencil printing according to claim 1, in which said oil phase comprises at least a solvent and an emulsifier.

6. An emulsion ink for stencil printing according to claim 1, in which a water-in-oil (O/W) emulsion of resin and/or a water-soluble resin is contained in said water phase.

* * * * *